US012311886B2

(12) United States Patent
Taniguchi et al.

(10) Patent No.: US 12,311,886 B2
(45) Date of Patent: May 27, 2025

(54) VEHICLE CENTER CONSOLE

(71) Applicant: HONDA MOTOR CO., LTD., Tokyo (JP)

(72) Inventors: Hiroyasu Taniguchi, Tokyo (JP); Hiroyuki Yamamoto, Wako (JP); Toshinori Tsukagoshi, Wako (JP); Michihiro Hoshijima, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 348 days.

(21) Appl. No.: 17/971,676

(22) Filed: Oct. 24, 2022

(65) Prior Publication Data
US 2023/0146107 A1    May 11, 2023

(30) Foreign Application Priority Data

Nov. 8, 2021  (JP) .................................. 2021-181892

(51) Int. Cl.
*B60R 7/04* (2006.01)
(52) U.S. Cl.
CPC ...................................... *B60R 7/04* (2013.01)
(58) Field of Classification Search
CPC ... B60R 7/04; B60R 2011/0075; B60R 11/02; B60R 2011/0007; B60R 7/08
See application file for complete search history.

(56) References Cited

U.S. PATENT DOCUMENTS 4,690,448 A * 9/1987 Fujisawa ................... B60R 7/04
296/37.8
5,823,599 A  10/1998 Gray
(Continued)

FOREIGN PATENT DOCUMENTS

JP  2010-036818   2/2010
JP  2013-220740  10/2013
(Continued)

OTHER PUBLICATIONS

CN 104885031 A with English Translation (Year: 2015).*
(Continued)

*Primary Examiner* — Lori Lyjak
(74) *Attorney, Agent, or Firm* — Amin, Turocy & Watson, LLP

(57) ABSTRACT

A center console includes an article placement portion, a front block portion, a rear block portion, a bridge portion, a rearward projection portion, and a finger insertion acceptance surface. The article placement portion has a placement surface on which an article having a rectangular plate shape is capable of being placed. The front block portion is arranged at a forward position of the article placement portion. The rear block portion is arranged at a rearward position of the article placement portion. The bridge portion is provided on the front block portion and the rear block portion and is arranged above the article placement portion to interpose a space portion. The rearward projection portion stands upward from a front portion of the placement surface and projects rearward toward a middle region in a vehicle width direction of the placement surface. The finger insertion acceptance surface is located at an outer position in the vehicle width direction of the rearward projection portion and extends forward from the placement surface.

5 Claims, 6 Drawing Sheets

(56) References Cited

U.S. PATENT DOCUMENTS

| | | |
|---|---|---|
| D533,492 S | 12/2006 | Maezono et al. |
| D718,200 S | 11/2014 | Arnaout et al. |
| D727,816 S | 4/2015 | Takagi et al. |
| 9,199,581 B2 | 12/2015 | Ishibashi et al. |
| D958,716 S | 7/2022 | Benjamin et al. |
| D972,998 S | 12/2022 | Carr |
| 2007/0024075 A1 | 2/2007 | Nakamura et al. |
| 2011/0062739 A1 | 3/2011 | Kuhlmann |
| 2014/0265420 A1 | 9/2014 | Myers et al. |
| 2014/0292015 A1* | 10/2014 | Lambert .............. H02J 7/14 |
| | | 320/108 |
| 2015/0069776 A1* | 3/2015 | Ishibashi .............. B60R 7/06 |
| | | 296/70 |
| 2017/0190295 A1 | 7/2017 | Ogawa |
| 2018/0194304 A1 | 7/2018 | Hupman et al. |
| 2021/0188140 A1 | 6/2021 | Mizobata et al. |
| 2023/0144981 A1* | 5/2023 | Taniguchi ............ B60R 7/04 |
| | | 296/24.34 |
| 2023/0146107 A1 | 5/2023 | Taniguchi et al. |
| 2023/0304339 A1 | 9/2023 | Kim et al. |

FOREIGN PATENT DOCUMENTS

| | | |
|---|---|---|
| JP | 2014-133503 | 7/2014 |
| JP | 2014-133509 | 7/2014 |
| JP | 2014-213632 | 11/2014 |
| JP | 2018-075875 | 5/2018 |
| JP | 2019-043433 | 3/2019 |
| JP | 2020-040497 | 3/2020 |
| JP | 2021-102356 | 7/2021 |
| JP | 2022-054361 | 4/2022 |

OTHER PUBLICATIONS

Japanese Office Action for Japanese Patent Application No. 2021-181892 mailed Sep. 12, 2023.

Japanese Office Action for Japanese Patent Application No. 2021-181887 mailed Sep. 12, 2023.

Non-Final Office Action for U.S. Appl. No. 17/970,636 mailed Oct. 9, 2024.

* cited by examiner

VEHICLE CENTER CONSOLE

CROSS-REFERENCE TO RELATED APPLICATION

Priority is claimed on Japanese Patent Application No. 2021-181892, filed on Nov. 8, 2021, the contents of which are incorporated herein by reference.

BACKGROUND

Field of the Invention

The present invention relates to a vehicle center console.

Background

As a structure inside a vehicle room of a vehicle, such a structure is known in which a center console on which a shift operation portion, a variety of switches, an article accommodation portion, and the like are arranged is provided between a driver seat and a passenger seat of a front seat (for example, refer to Japanese Unexamined Patent Application, First Publication No. 2014-213632).

In the center console described in Japanese Unexamined Patent Application, First Publication No. 2014-213632, an article accommodation portion that has a substantially rectangular shape and opens upward is formed on an upper portion of a console main body having a box shape. A variety of articles can be accommodated in the article accommodation portion through an upper opening.

SUMMARY

However, in the center console described in Japanese Unexamined Patent Application, First Publication No. 2014-213632, since an opening shape of the article accommodation portion is a substantially rectangular shape, when an article having a rectangular shape such as a portable information terminal is placed in the article accommodation portion such that a flat surface faces downward, it becomes difficult to remove the article. In particular, when a forward-rearward width of the article is close to a forward-rearward width of the opening of the article accommodation portion, it is difficult to place a finger on an end portion of the article at the time of removal of the article.

Further, in recent years, a center console has been proposed having a structure in which a front block portion and a rear block portion are arranged at front and rear positions of an article placement portion having a tray shape, respectively, and a bridge portion that is provided on the front block portion and the rear block portion bridges an upper section of the article placement portion in a forward-rearward direction.

In the case of this type of center console, since an upper space of the article placement portion is greatly limited by the bridge portion, when an article having a rectangular plate shape is placed on the article placement portion, it becomes difficult to place a finger on an end portion of the article on the article placement portion and remove the article.

An aspect of the present invention provides a vehicle center console in which an article having a rectangular plate shape that is placed on an article placement portion is capable of being easily removed from the article placement portion.

A vehicle center console according to an aspect of the present invention includes: an article placement portion having a placement surface on which an article having a rectangular plate shape is capable of being placed; a front block portion that is arranged at a forward position of the article placement portion; a rear block portion that is arranged at a rearward position of the article placement portion; a bridge portion that is provided on the front block portion and the rear block portion and is arranged above the article placement portion to interpose a space portion; a rearward projection portion that stands upward from a front portion of the placement surface and projects rearward toward a middle region in a vehicle width direction of the placement surface; and a finger insertion acceptance surface that is located at an outer position in the vehicle width direction of the rearward projection portion and extends forward from the placement surface.

According to the configuration described above, when an article having a rectangular plate shape is placed on the placement surface of the article placement portion, a front position of the article is limited by the projection portion, and the article is not arranged on the finger insertion acceptance surface. Therefore, when the article is removed from the article placement portion, a user can insert his/her finger toward the finger insertion acceptance surface, place his/her fingertip on a front end portion of the article, and easily remove the article from the article placement portion.

Further, in the center console of the present configuration, since the bridge portion is arranged above the article placement portion, even if a liquid such as a drink is accidentally spilled at an upper side of the center console, it is possible to prevent the liquid from being slopped on the article on the article placement portion and protect the article. Further, although the bridge portion is arranged above the article placement portion, since the finger insertion acceptance surface is arranged close to the outside in the vehicle width direction of a front section of the article placement portion, it is possible to easily place one's finger on the front end portion of the article that is placed on the article placement portion.

A slip prevention member may be arranged on an upper surface of the placement surface.

In this case, when placing one's finger on the front end portion of the article that is placed on the article placement portion and causing the article to stand forward, slipping of a rear end portion of the article is prevented by the slip prevention member. Therefore, it is possible to cause the article to stand forward and easily remove the article from the article placement portion.

A side wall that stands upward may be provided on both side portions in the vehicle width direction of the placement surface, and a curved surface that is curved in a recess shape from the placement surface toward an upper side of the side wall may be provided between the placement surface and each side wall.

In this case, when placing one's finger on a side portion at a back side of the article that is placed on the article placement portion and drawing the article in a side wall direction to the front side, a side end portion on the front side of the article is lifted upward along the curved surface. Accordingly, by keeping drawing the article, it is possible to easily remove the article from the article placement portion.

A narrow width section in which a width in the vehicle width direction is narrower than that of the placement surface, and an end portion at both sides in the vehicle width direction is located at a further inward position than an end portion at both sides in the vehicle width direction of the placement surface may be provided at least in a middle region in a forward-rearward direction of the bridge portion.

In this case, when the article that is placed on the article placement portion is a portable information terminal having a display screen, in a case where the portable information terminal is placed close to one seat on the placement surface, it is possible to easily view and confirm the screen of the portable information terminal from the one seat through a space on the front side of the narrow width section of the bridge portion. Further, in a case where an occupant in the other seat places a portable information terminal close to the other seat on the placement surface, the screen is hidden by the bridge portion (the narrow width section) and is unlikely to be seen from an occupant in the one seat. Accordingly, when the present configuration is employed, it is possible to protect the privacy of the occupants seated in the right and left seats of the front seats.

Further, in the present configuration, since the narrow width section is provided at least in the middle region in the forward-rearward direction of the bridge portion, when placing one's finger on the front end portion of the article that is placed on the article placement portion and removing the article, the person's hand is unlikely to interfere with the bridge portion, and the article is easily removed.

An inclination wall that is inclined to a forward side toward an upward direction may be arranged at a forward position of the finger insertion acceptance surface, a terminal connection port to which a terminal of an electricity use device is connected may be arranged on the inclination wall, and an eave section that extends above the terminal connection port may be provided on the front block portion.

In this case, since the terminal connection port is arranged on the inclination wall that is arranged on a front section close to the outside in the width direction of the article placement portion, an occupant can easily attach and detach the terminal of the electricity use device with respect to the terminal connection port while being seated in the front seat. Further, since an upper portion of the terminal connection port is covered by the eave section that extends from the front block portion, when a liquid such as a drink is accidentally spilled at the upper portion of the center console, it is possible to reliably prevent the liquid from being slopped on the terminal connection port by the eave section.

Further, in the present configuration, since the inclination wall is arranged at a forward position of the finger insertion acceptance surface, when placing one's finger on the front end portion of the article that is placed on the article placement portion and removing the article, the person's hand is unlikely to interfere with the front block portion, and the article is easily removed.

In the vehicle center console according to an aspect of the present invention, when an article having a rectangular plate shape is placed on the placement surface of the article placement portion, a front position of the article is regulated by the rearward projection portion, and the article is not arranged on the finger insertion acceptance surface. Therefore, by inserting a finger toward the finger insertion acceptance surface, it is possible to place one's finger on a front portion of the article that is placed on the article placement portion and easily remove the article from the article placement portion.

DESCRIPTION OF EMBODIMENTS

Figure 1:
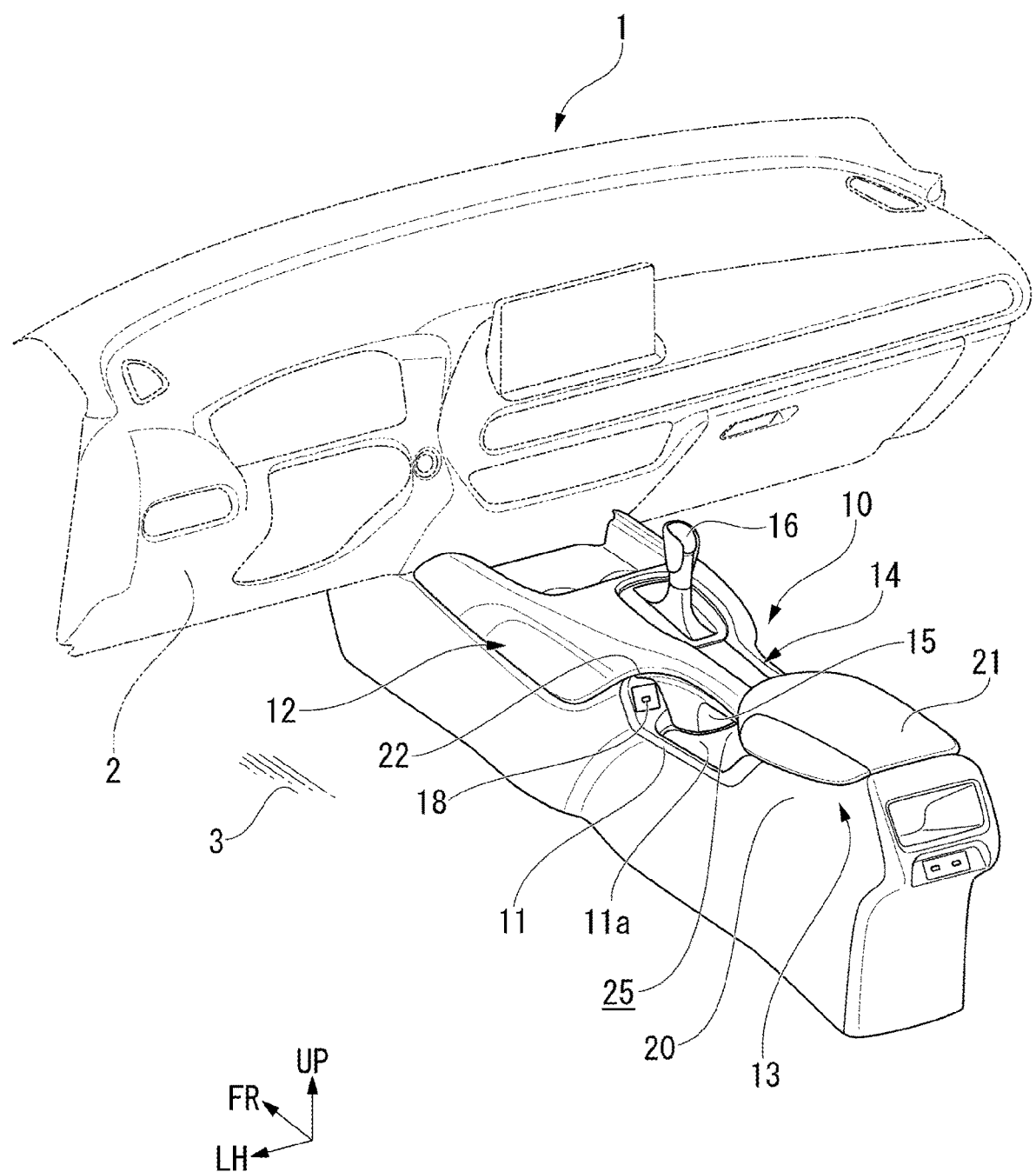
FIG. 1 is a perspective view of a vehicle room front portion of a vehicle according to an embodiment.

Hereinafter, an embodiment of the present invention will be described with reference to the drawings.

Forward, rearward, upward, downward, rightward, and leftward directions in the following description mean forward, rearward, upward, downward, rightward, and leftward directions with respect to a vehicle unless otherwise specified. In appropriate positions in the drawings, an arrow UP that indicates a vehicle upward direction, an arrow FR that indicates a vehicle forward direction, and an arrow LH that indicates a vehicle leftward direction are shown.

FIG. 1 is a perspective view showing a front portion of a front seat inside a vehicle room of a vehicle 1 according to an embodiment.

As shown in FIG. 1, an instrument panel 2 on which a variety of instruments, an audio operation portion, an air conditioner operation portion, and the like are installed is arranged at the front of the front seat inside the vehicle room. The vehicle 1 of the present embodiment is a so-called left-hand drive vehicle in which a driver seat is arranged on a left side toward a vehicle forward side, and a passenger seat is arranged on a right side. A center console 10 is arranged between the driver seat and the passenger seat. The center console 10 projects upward with respect to a floor 3 inside the vehicle room, and a front end portion extends to a lower region of the instrument panel 2. The center console 10 is formed in a substantially rectangular shape in which the entire center console 10 is elongated in a forward-rearward direction.

Figure 2:
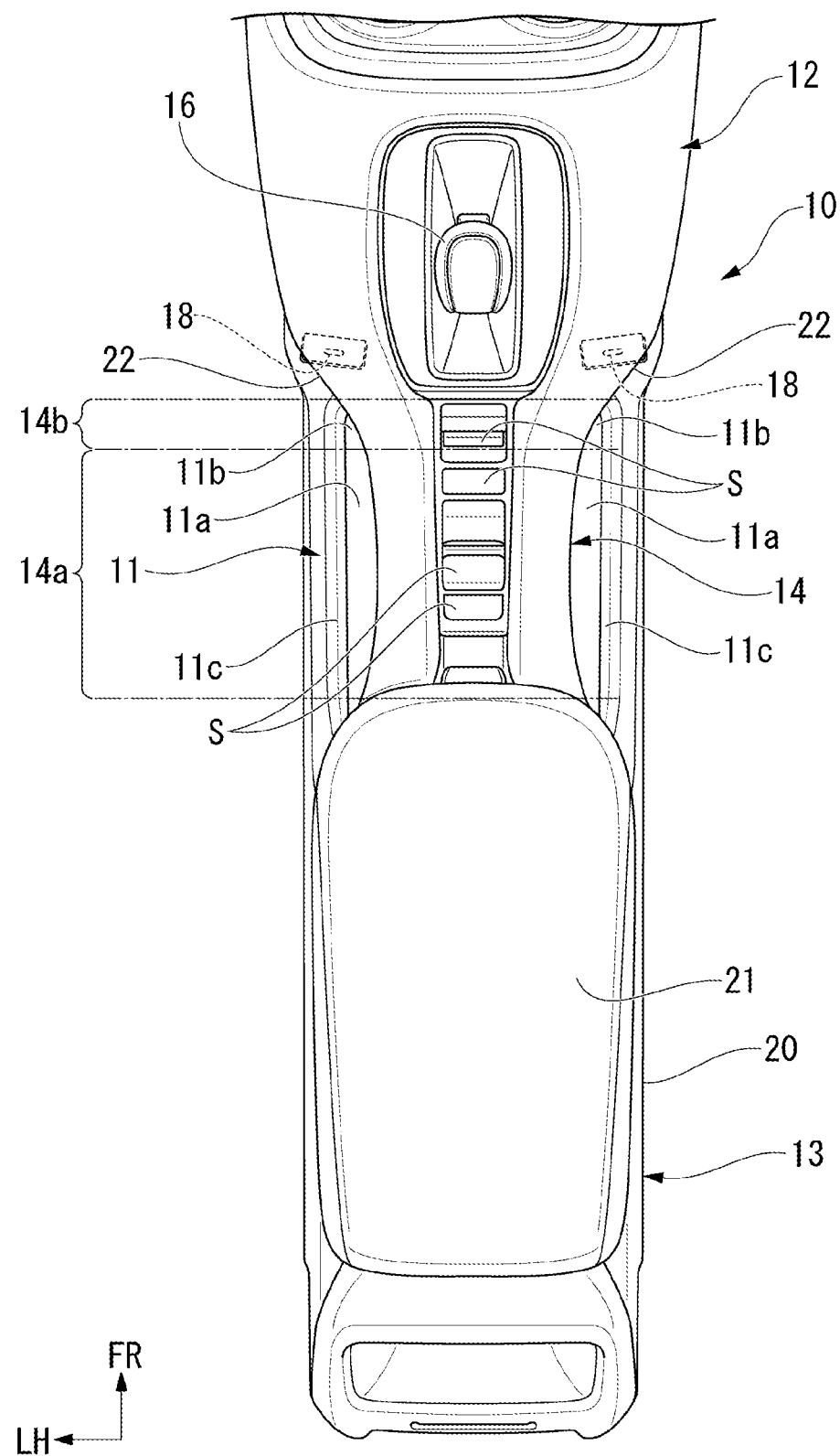
FIG. 2 is a plan view of a center console according to the embodiment.
Figure 3:
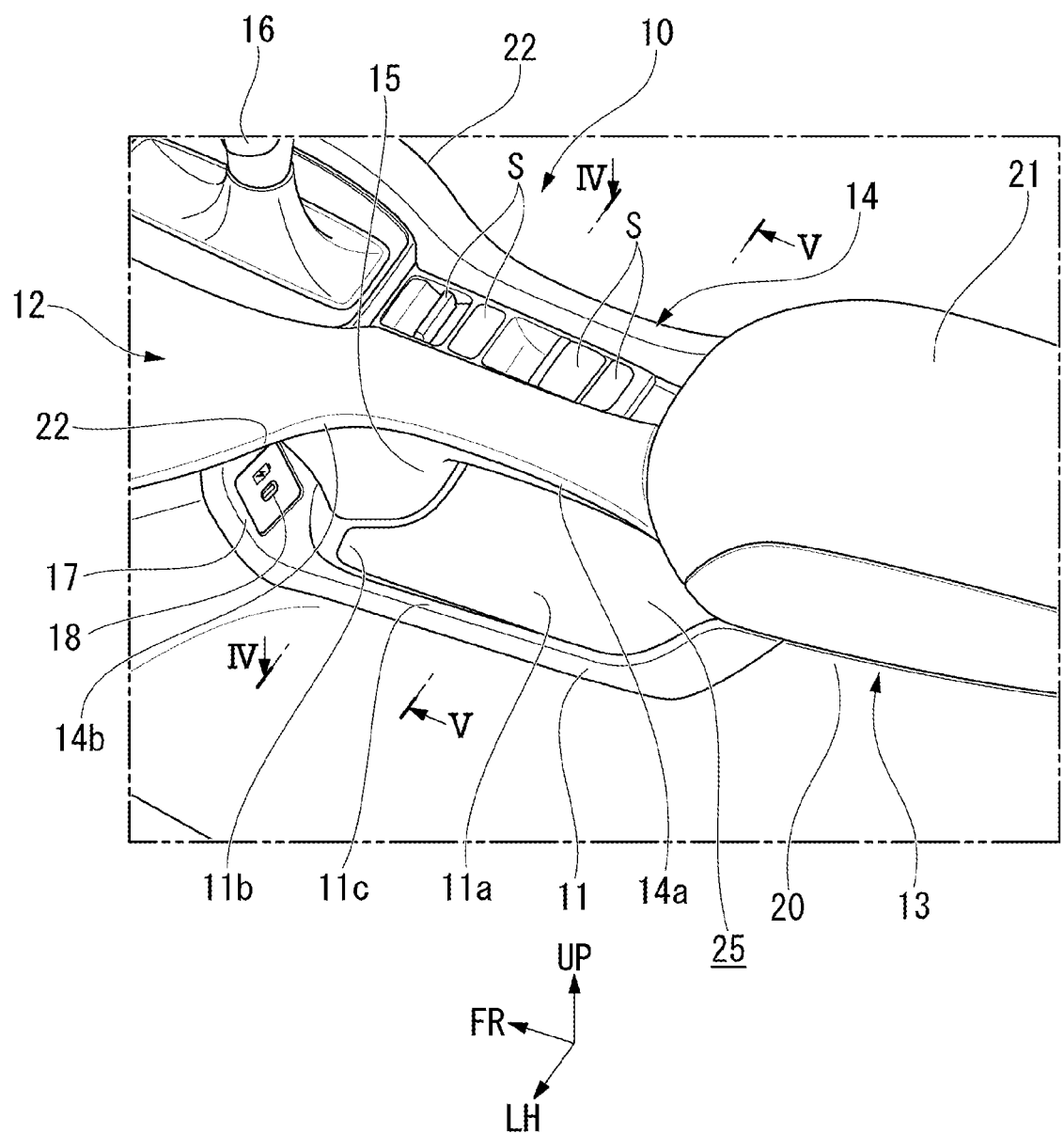
FIG. 3 is a perspective view of the center console according to the embodiment.

FIG. 2 is a plan view of the center console 10. FIG. 3 is a perspective view of the center console 10 seen from a rear left upper direction.

The center console 10 includes: an article placement portion 11 having a flat placement surface 11a on an upper surface of the article placement portion 11; a front block portion 12 that is arranged at a forward position of the article placement portion 11; a rear block portion 13 that is arranged at a rearward position of the article placement portion 11; and a bridge portion 14 that is provided on the front block portion 12 and the rear block portion 13.

The article placement portion 11 includes: a placement surface 11a that extends substantially horizontally and has a substantially rectangular shape in a top view; an extension placement surface 11b that extends forward substantially horizontally from right and left side end portions of the placement surface 11a; and a side wall 11c that stands upward from an outer end portion in a vehicle width direction of the placement surface 11a and the extension placement surface 11b. The article placement portion 11 is formed in a tray shape having an edge on both right and left sides. A rearward projection portion 15 that stands upward is arranged in a middle region in the vehicle width direction of a front portion of the placement surface 11a. The rearward projection portion 15 constitutes part of a rear wall of the front block portion 12. The rearward projection portion 15 projects in an arc shape toward a vehicle rearward side in the middle region in the vehicle width direction of the front portion of the placement surface 11a. Right and left extension placement surfaces 11b are a forward extension region of the placement surface 11a that is divided in a rightward-leftward direction by the rearward projection portion 15.

Figure 4:
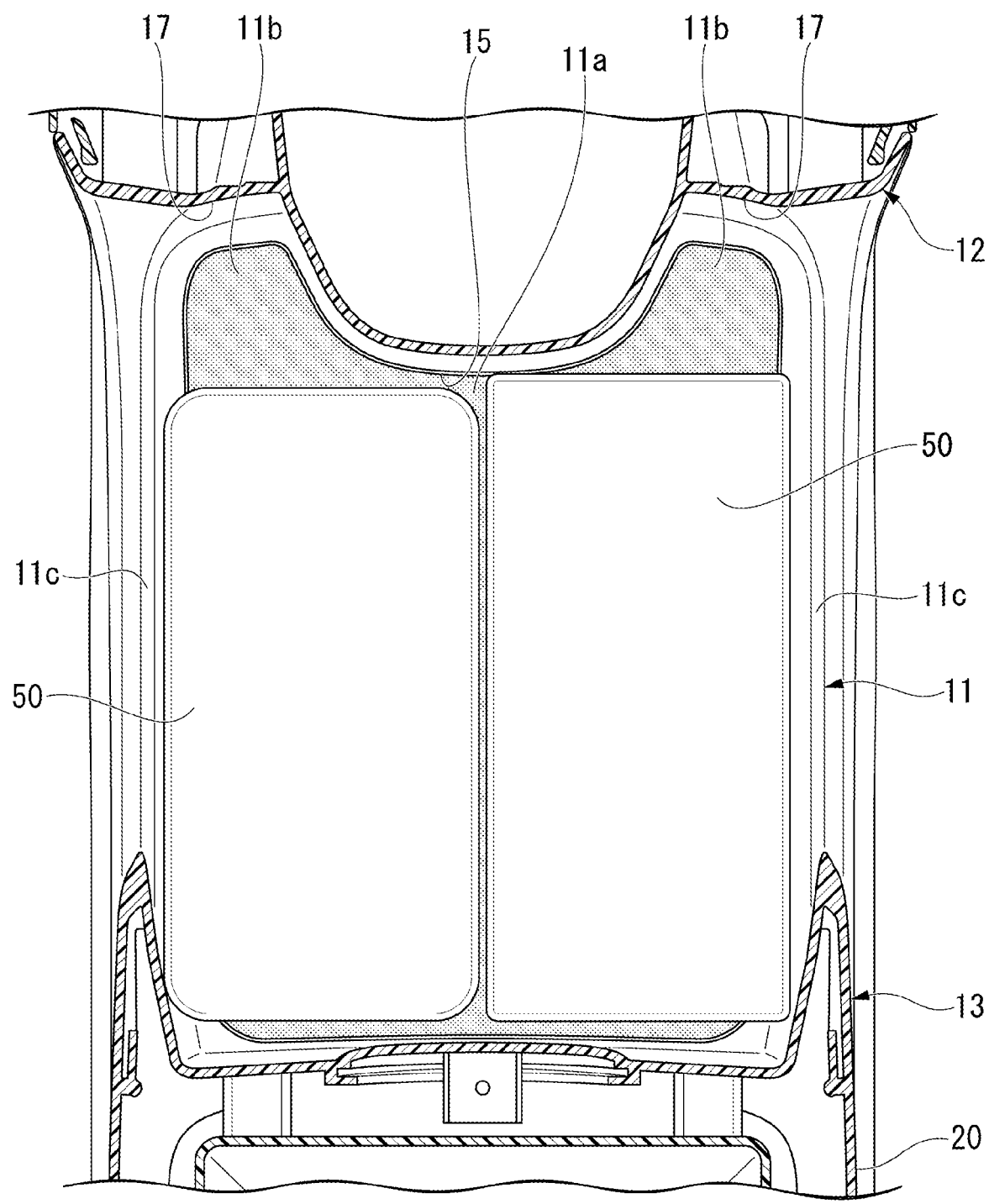
FIG. 4 is a cross-sectional view along a IV-IV line of FIG. 3.

FIG. 4 is a cross-sectional view along a IV-IV line of FIG. 3.

As shown in FIG. 4, when an article having a rectangular plate shape such as a portable information terminal 50 is placed on the placement surface 11a, the rearward projection portion 15 can regulate a forward displacement of the article by coming into contact with a front end portion of the article. Further, when the article having a rectangular plate shape is placed on the placement surface 11a, a space by the extension placement surface 11b is ensured in front of a front end portion close to the outside in the width direction of the article. When the article having a rectangular plate shape is removed from the placement surface 11a, a user can insert his/her finger into the space by the extension placement surface 11b and easily remove the article by placing his/her finger on a front end portion of the article.

In the present embodiment, the extension placement surface 11b constitutes a finger insertion acceptance surface. The extension placement surface 11b has approximately a width and a length in a forward-rearward direction in which first and second joints of a fingertip can be inserted into an upper space of the extension placement surface 11b.

The front block portion 12 is a block in which a shift lever 16 is arranged on an upper surface of the front block portion 12, and a lever interlock device, a wiring, and the like are embedded inside the block portion 12. A front end section of the front block portion 12 is connected to a lower portion in a middle region in the vehicle width direction of the instrument panel 2. The rearward projection portion 15 described above is provided in a middle region in the vehicle width direction of a rear section of the front block portion 12. An inclination wall 17 that is inclined to a vehicle forward side toward an upward direction is formed on each of both right and left sides of the rear rearward projection portion 15 at the rear section of the front block portion 12. Each inclination wall 17 is arranged at a forward position of each of right and left extension placement surfaces 11b of the article placement portion 11 and is also inclined in the vehicle width direction toward a direction of an occupant seated in the front seat (the driver seat or the passenger seat) (so as to substantially face the seated occupant).

A terminal connection port 18 to which an electricity use device such the portable information terminal 50 is connected is provided on each of right and left inclination walls 17. The terminal connection port 18 is a connection port such as a USB port to which a terminal for performing electric power supply, transmission and reception of a signal, or the like with the electricity use device is connected. The shape or the structure of the terminal connection port 18 is arbitrary. The number of terminal connection ports 18 provided on the inclination wall 17 may be two or more. In this case, the terminal connection ports 18 may be ports of the same form (the same standard) or may be ports of a different form (different standard).

A terminal of a cable connected to the electricity use device such the portable information terminal 50 can be connected to each terminal connection port 18. A terminal provided to protrude on a device can also be inserted directly to each terminal connection port 18 if the device is a flash memory or the like.

An eave section 22 that extends toward a vehicle rearward direction and covers an upper portion of the terminal connection port 18 is provided to extend on an upper end portion of each of right and left inclination walls 17.

The rear block portion 13 includes an article storage recess section 20 that opens upward and a lid body 21 that opens and closes an opening of the article storage recess section 20. An opening/closing hinge (not shown) is provided on a rear end side of the lid body 21, and the lid body 21 is operated (rotated) around a hinge axis of the opening/closing hinge by an operation of an occupant. When the opening of the article storage recess section 20 is opened, a front end side of the lid body 21 is greatly lifted upward around a rear end side of the lid body 21. Further, a cushion material is embedded in an upper surface side and a circumferential region of the lid body 21. The lid body 21 also functions as an arm rest on which an occupant seated in the front seat places his/her arm in a state where the opening of the article storage recess section 20 is closed.

The bridge portion 14 extends in a vehicle forward-rearward direction and connects a rear upper end section of the front block portion 12 to a front upper end section of the rear block portion 13 (article storage recess section 20). The bridge portion 14 is arranged above the article placement portion 11 to interpose a space portion 25. The width in the vehicle width direction of the bridge portion 14 may be narrower than a width in the vehicle width direction of the placement surface 11a of the article placement portion 11.

More specifically, a section to a rear end from a middle region in a forward-rearward direction of the bridge portion 14 is a narrow width section 14a in which a width in the vehicle width direction is sufficiently narrower than that of the placement surface 11a, and an end portion at both sides in the vehicle width direction is located at a further inward position than an end portion at both sides in the vehicle width direction of the placement surface 11a. A widened width section 14b in which a width in the vehicle width direction is gradually increased to a forward direction is provided on a front side of the narrow width section 14a of the bridge portion 14. A front end of the widened width section 14b is integrally connected to a rear section of the front block portion 12.

An outer edge in the width direction on a front end side of the widened width section 14b is provided continuously to the eave section 22 described above of the front block portion 12.

Since in the narrow width section 14a of the bridge portion 14, the end portion at both sides in the vehicle width direction is located at a further inward position than the end portion at both sides in the vehicle width direction of the placement surface 11a, as shown in FIG. 2, when the center console 10 is seen from an upward direction, part of both side edges in the vehicle width direction of the placement surface 11a is exposed outward. Therefore, as shown in FIG. 4, in a case where the portable information terminal 50 is placed close to a side portion of the placement surface 11a such that a screen faces upward, it is possible to easily view the screen of the portable information terminal 50 from an occupant seated in a seat (the driver seat or the passenger seat) at a side close to the placed portable information terminal 50. At this time, from an occupant seated in a seat (the passenger seat or the driver seat) at a side far from the placed portable information terminal 50, the bridge portion 14 (narrow width section 14a) becomes a blinder, and viewing of the screen of the portable information terminal 50 is blocked. Accordingly, the screen of a portable information terminal 50 which an occupant seated in one of the front seats places at a side close to the occupant is not seen by the next occupant, and it is possible to protect the privacy of each passenger in the front seats.

The terminal connection port 18 that is provided on each of the right and left inclination walls 17 at the front section of the article placement portion 11 is arranged at a position that does not overlap the bridge portion 14 in a top view. Further, the arrangement position of the terminal connection port 18 can be desirably a position that does not overlap the bridge portion 14 when seen from a visual line direction of the occupant seated in the front seat.

A variety of switches S such as a parking switch is arranged to be aligned in a forward-rearward direction on an upper surface of the bridge portion 14.

Figure 5:
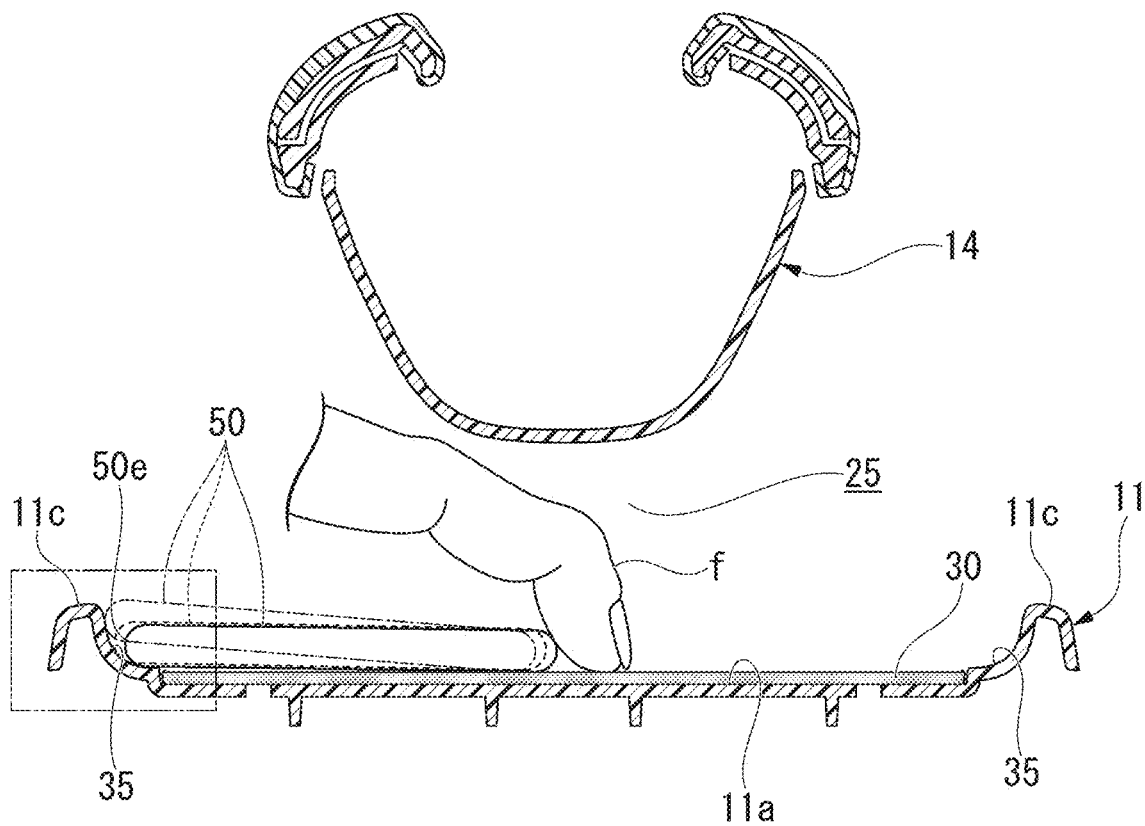
FIG. 5 is a cross-sectional view along a V-V line of FIG. 3.
Figure 6:
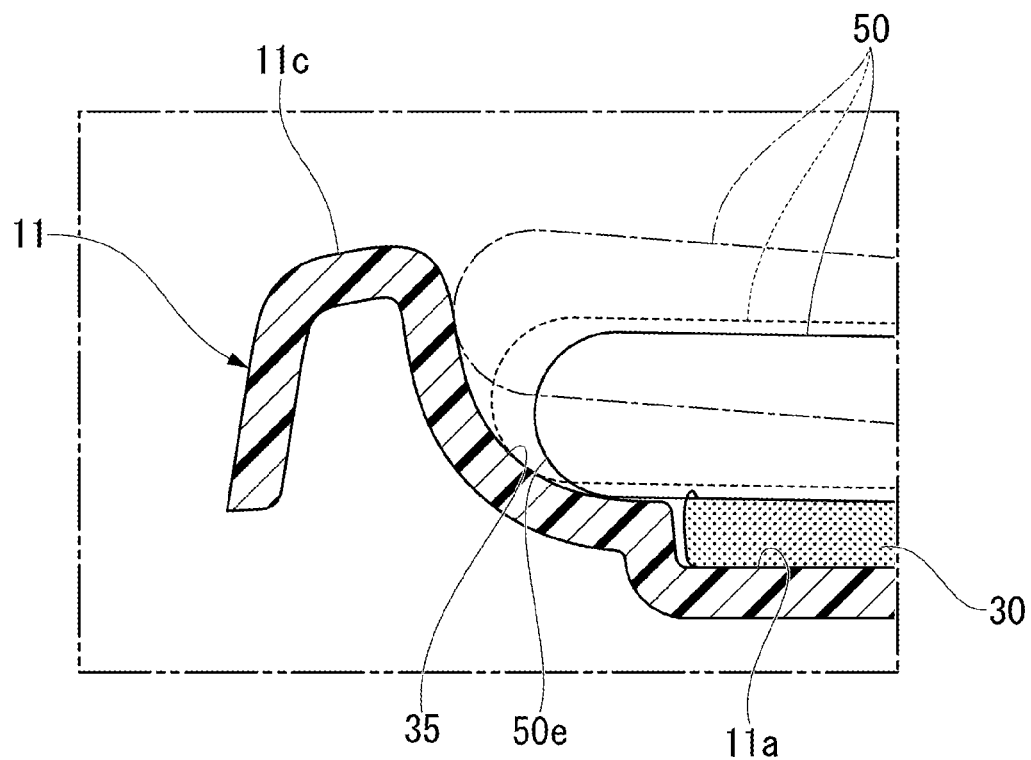
FIG. 6 is an enlarged view of a VI portion of FIG. 5.

FIG. 5 is a cross-sectional view along a V-V line of FIG. 3. FIG. 6 is an enlarged view of a VI portion of FIG. 5.

As shown in FIG. 5 and FIG. 6, a mat 30 in which at least an upper surface side has a slip prevention function is arranged on the placement surface 11a of the article placement portion 11. The mat 30 may be constructed of, for example, a rubber material having elasticity, a soft resin, or the like. When an article having a rectangular plate shape such as the portable information terminal 50 is placed on the upper surface, the mat 30 can prevent slippage of an end portion of the article. Therefore, when placing one's finger on a front end portion of the article and causing the article to stand, a rear end portion of the article is reliably locked on the mat 30, and as a result, the front end side of the article easily stands.

In the present embodiment, the mat 30 constitutes a slip prevention member.

A curved surface 35 that is curved in a recess shape from the placement surface 11a of the article placement portion 11 toward an upper side of the side wall 11c of each of both sides in the vehicle width direction is provided between the placement surface 11a and each side wall 11c. A step portion having a recess shape is formed on a portion on which the mat 30 is provided on the placement surface 11a such that the upper surface of the mat 30 is substantially flush with the side edge portion of the placement surface 11a. The mat 30 which is the slip prevention member is not provided from the side edge portion of the placement surface 11a to the curved surface 35.

With respect to the article such as the portable information terminal 50 that is placed on the placement surface 11a of the article placement portion 11, as shown in FIG. 5, by placing one's finger f on a side end portion at a back side in the width direction of the article from an upward direction and pulling the article to the side wall 11c on a front side, a side end portion 50e on the front side of the article can be caused to stand. At this time, as shown in an enlarged view of FIG. 6, the side end part 50e of the article can slide upward on the curved surface 35, and by further pulling one's finger f to the front side, it is possible to cause the article to stand and remove the article.

As described above, in the center console 10 of the present embodiment, when an article (for example, the portable information terminal 50) having a rectangular plate shape is placed on the placement surface 11a of the article placement portion 10, a front position of the article is regulated by the rearward projection portion, and the article is not arranged on the extension placement surface 11b (finger insertion acceptance surface). Therefore, a user seated in the front seat can insert his/her finger toward the extension placement surface 11b, thereby place his/her finger on a front portion of the article that is placed on the article placement portion 11, and easily remove the article from the article placement portion 11.

In particular, in the present embodiment, since the rearward projection portion projects rearward in an arc shape, it is possible to ensure a large rear end side of the extension placement surface 11b (finger insertion acceptance surface) at the inside in the width direction. Therefore, at the time of removal of the article, one's finger can be easily placed close to a middle portion in the width direction of the article having a rectangular plate shape. Therefore, it is possible to further easily perform a removal work of the article.

Further, in the center console 10 of the present embodiment, since the bridge portion 14 is arranged above the article placement portion 11, even if a liquid such as a drink is accidentally spilled at an upper side of the center console 10, it is possible to prevent the liquid from being slopped on the article on the article placement portion 11 and protect the article. Further, in the present structure, since the bridge portion 14 is present above the article placement portion 11, various types of switches can be arranged at an upper surface position of the bridge portion 14 where a seated occupant can easily operate the switches.

Further, in the center console 10 of the present embodiment, although the bridge portion is arranged above the article placement portion, since the extension placement surface 11b (finger insertion acceptance surface) is arranged at a position close to the outside in the vehicle width direction of a front section of the article placement portion 11, it is possible to easily place one's finger on the front end portion of the article that is placed on the article placement portion 11.

Further, in the center console 10 of the present embodiment, the mat 30 for slip prevention (slip prevention member) is provided on the upper surface of the placement surface of the article placement portion 11. When placing one's finger on the front end portion of the article that is placed on the article placement portion 11 and causing the article to stand forward, slipping of the rear end portion of the article can be prevented by the mat 30 for slip prevention.

Accordingly, in a case where the present configuration is employed, it is possible to easily remove the article from the article placement portion 11 even when a forward-rearward length of the article is shorter than a forward-rearward length of the placement surface 11a.

Further, in the center console 10 of the present embodiment, the curved surface 35 that is curved in a recess shape from the placement surface 11a toward an upper side of the side wall 11c is formed between the placement surface 11a of the article placement portion 11 and each side wall 11c. Therefore, by placing one's finger f on an end portion at a back side in the width direction of the article that is placed on the placement surface 11a and pulling the article to the front side in that state, a side end portion on the front side of the article can be lifted upward along the curved surface 35.

Accordingly, in a case where the present configuration is employed, by drawing the article that is placed on the placement surface 11a to the front side in the width direction, it is possible to easily remove the article from the article placement portion 11.

Further, in the center console 10 of the present embodiment, the narrow width section 14a in which a width in the vehicle width direction is narrower than that of the placement surface 11a, and an end portion at both sides in the vehicle width direction is located at a further inward position than an end portion at both sides in the vehicle width direction of the placement surface 11a is provided in an area from a middle region in a forward-rearward direction to a rear end of the bridge portion 14. Therefore, when a portable information terminal 50 is placed on a side section close to one seat on the placement surface 11a of the article placement portion 11, it is possible to easily view and confirm the screen of the portable information terminal 50 from the one seat through a space on the front side of the narrow width section 14a of the bridge portion 14. Further, in a case where an occupant in the other seat places a portable information terminal 50 at a side section close to the other seat on the placement surface 11a, the screen of the portable information terminal 50 is hidden by the narrow width section 14a and is unlikely to be seen from an occupant in the one seat.

Accordingly, in a case where the present configuration is employed, it is possible to protect the privacy of the occupants seated in the right and left seats of the front seats.

Further, in the center console 10 of the present embodiment, since the narrow width section 14a is provided at least in the middle region in the forward-rearward direction of the bridge portion 14, when placing one's finger on the front end portion of the article that is placed on the article placement portion 11 and removing the article, the person's hand is unlikely to interfere with the bridge portion 14, and the article is easily removed. Further, even when placing one's finger on the back side in the width direction of the article that is placed on the article placement portion 11 and removing the article, the person's hand is unlikely to interfere with the bridge portion 14, and the article is easily removed.

Further, in the center console 10 of the present embodiment, the inclination wall 17 is arranged at a forward position of the extension placement surface 11b (finger insertion acceptance surface), and the terminal connection port 18 is provided on the inclination wall 17. Therefore, the terminal connection port 18 is arranged on a front section close to the outside in the width direction of the article placement portion 11 in a state of being inclined upward. Accordingly, an occupant can easily attach and detach the terminal of the electricity use device with respect to the terminal connection port 18 while being seated in the front seat.

Further, in the center console 10 of the present embodiment, the eave section 22 that extends above the terminal connection port 18 is provided on the front block portion 12. Therefore, since an upper portion of the terminal connection port 18 is covered by the eave section 22 of the front block portion 12, when a liquid such as a drink is accidentally spilled at an upper portion of the center console 10, it is possible to reliably prevent the liquid from being slopped on the terminal connection port 18 by the eave section 22.

Further, since the inclination wall 17 is arranged at a forward position of the extension placement surface 11b so as to be inclined forward toward an upward direction, when placing one's finger on the front end portion of the article that is placed on the placement surface 11a and removing the article, the person's hand is unlikely to interfere with the front block portion 12, and the article is easily removed.

The present invention is not limited to the embodiment described above, and various design changes can be made without departing from the scope of the invention.

For example, the above embodiment is described using an example in which the area from the middle region in the forward-rearward direction to the rear end of the bridge portion 14 is the narrow width section 14a; however, a region in which the narrow width section 14a is arranged is not limited thereto. The region in which the narrow width section 14a is arranged may include at least the middle region in the forward-rearward direction of the bridge portion 14.

Further, the above embodiment is described using an example in which the mat 30 which is a slip prevention member is provided on the placement surface 11a of the article placement portion 11; however, the slip prevention member does not necessarily have a mat shape and may have a block shape or an arbitrary shape. Further, the slip prevention member is not necessarily required if a protrusion portion or the like that regulates displacement of the article toward a rearward side is provided in a rear region on the placement surface 11a.

What is claimed is:

1. A vehicle center console comprising:
an article placement portion having a placement surface on which an article having a rectangular plate shape is capable of being placed;
a front block portion that is arranged at a forward position of the article placement portion;
a rear block portion that is arranged at a rearward position of the article placement portion;
a bridge portion that is provided on the front block portion and the rear block portion and is arranged above the article placement portion to interpose a space portion;
a rearward projection portion that stands upward from a front portion of the placement surface and projects rearward toward a middle region in a vehicle width direction of the placement surface; and
a finger insertion acceptance surface that is located at an outer position in the vehicle width direction of the rearward projection portion and extends forward from the placement surface.

2. The vehicle center console according to claim 1, wherein a slip prevention member is arranged on an upper surface of the placement surface.

3. The vehicle center console according to claim 1, wherein a side wall that stands upward is provided on both side portions in the vehicle width direction of the placement surface, and
a curved surface that is curved in a recess shape from the placement surface toward an upper side of the side wall is provided between the placement surface and each side wall.

4. The vehicle center console according to claim 1, wherein a narrow width section in which a width in the vehicle width direction is narrower than that of the placement surface, and an end portion at both sides in the vehicle width direction is located at a further inward position than an end portion at both sides in the vehicle width direction of the placement surface is provided at least in a middle region in a forward-rearward direction of the bridge portion.

5. The vehicle center console according to claim 4, wherein an inclination wall that is inclined to a forward side toward an upward direction is arranged at a forward position of the finger insertion acceptance surface,
a terminal connection port to which a terminal of an electricity use device is connected is arranged on the inclination wall, and
an eave section that extends above the terminal connection port is provided on the front block portion.

* * * * *